(12) United States Patent
Lee et al.

(10) Patent No.: US 11,153,575 B2
(45) Date of Patent: Oct. 19, 2021

(54) ELECTRONIC APPARATUS AND CONTROL METHOD THEREOF

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Hyunseung Lee, Suwon-si (KR); Donghyun Kim, Suwon-si (KR); Youngsu Moon, Suwon-si (KR); Taegyoung Ahn, Suwon-si (KR); Yoonsik Kim, Seoul (KR); Jaewoo Park, Seoul (KR); Jae Woong Soh, Seoul (KR); Nam Ik Cho, Seoul (KR); Byeongyong Ahn, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/292,655

(22) Filed: Mar. 5, 2019

(65) Prior Publication Data

US 2019/0281310 A1 Sep. 12, 2019

(30) Foreign Application Priority Data

Mar. 6, 2018 (KR) .......................... 10-2018-0026209

(51) Int. Cl.
*H04N 19/176* (2014.01)
*G06K 9/40* (2006.01)
(Continued)

(52) U.S. Cl.
CPC ............. *H04N 19/176* (2014.11); *G06K 9/40* (2013.01); *G06N 3/02* (2013.01); *H04N 19/137* (2014.11)

(58) Field of Classification Search
CPC ...... H04N 19/176; H04N 19/137; G06K 9/40; G06N 3/02
See application file for complete search history.

(56) References Cited

U.S. PATENT DOCUMENTS 9,565,439 B2 * 2/2017 Bush .................... H04N 19/154
10,083,499 B1 * 9/2018 Milanfar ................. G06T 5/001
(Continued)

FOREIGN PATENT DOCUMENTS

CN 106295682 1/2017
CN 107743235 A * 2/2018
(Continued)

OTHER PUBLICATIONS

Search Report dated May 27, 2019 in International Application No. PCT/KR2019/001801 and English-language translation.
(Continued)

*Primary Examiner* — Maria E Vazquez Colon
(74) *Attorney, Agent, or Firm* — Nixon & Vanderhye P.C.

(57) ABSTRACT

An electronic apparatus is provided. The electronic apparatus includes a storage configured to store a compression rate network model configured to determine a compression rate applied to an image block from among a plurality of compression rates, and a plurality of compression noise removing network models configured to remove compression noise for each of the plurality of compression rates, and a processor configured to: obtain a compression rate of each of a plurality of image blocks included in a frame of a decoded moving picture based on the compression rate network model, obtain the compression rate of the frame based on the plurality of obtained compression rates, and remove compression noise of the frame based on a compression noise removing network model corresponding to the compression rate of the frame from among the plurality of compression noise removing network models. The com-
(Continued)

pression rate network model can be obtained by learning image characteristics of a plurality of restored image blocks corresponding to each of the plurality of compression rates through a first artificial intelligence algorithm, and the plurality of restored image blocks can be generated by encoding a plurality of original image blocks, and decoding the encoded plurality of original image blocks, and the plurality of compression noise removing network models can be obtained by learning a relation between the plurality of original image blocks and the plurality of restored image blocks through a second artificial intelligence algorithm.

20 Claims, 9 Drawing Sheets

(51) Int. Cl.
  *G06N 3/02* (2006.01)
  *H04N 19/137* (2014.01)

(56) References Cited

U.S. PATENT DOCUMENTS

| | | | |
|---|---|---|---|
| 10,255,663 B2* | 4/2019 | Otsuka | G06T 5/50 |
| 2006/0140268 A1 | 6/2006 | Ha et al. | |
| 2015/0131716 A1* | 5/2015 | Cho | H04N 19/174 |
| | | | 375/240.02 |
| 2015/0371406 A1 | 12/2015 | Amit et al. | |
| 2016/0125572 A1 | 5/2016 | Yoo et al. | |
| 2016/0292589 A1 | 10/2016 | Taylor, Jr. et al. | |
| 2016/0321523 A1 | 11/2016 | Sen et al. | |
| 2017/0364744 A1 | 12/2017 | Savchenkov et al. | |

FOREIGN PATENT DOCUMENTS

| | | |
|---|---|---|
| EP | 1 677 543 A2 | 7/2006 |
| JP | 6083162 | 2/2017 |
| KR | 10-0803594 | 2/2008 |
| KR | 10-2016-0053612 | 5/2016 |
| KR | 10-2017-0077621 | 7/2017 |

OTHER PUBLICATIONS

Written Opinion dated May 27, 2019 in International Application No. PCT/KR2019/001801 and English-language translation.
Pavel Svoboda et al., "Compression Artifacts Removal Using Convolutional Neural Networks", Journal of WSCG, 2016, vol. 24, No. 2, pp. 63-72.
European Extended Search Report dated Nov. 12, 2020 for EP Application No. 19763926.3.
Soh et al., "Reduction of Video Compression Artifacts Based on Deep Temporal Networks", IEEE Access, vol. 6, Oct. 22, 2018; XP011704852; 13 pgs.
Kim et al., "A Pseudo-Blind Convolutional Neural Network for the Reduction of Compression Artifacts", IEEE Transactions on Circuits and Systems for Video Technology, vol. 30, No. 4, Feb. 26, 2019, XP011781831, 15pgs.
Li et al., "Learning Convolutional Networks for Content-Weighted Image Compression", arvix .org, Cornell University Library, Mar. 30, 2017, XP080753253, 11pgs.

* cited by examiner

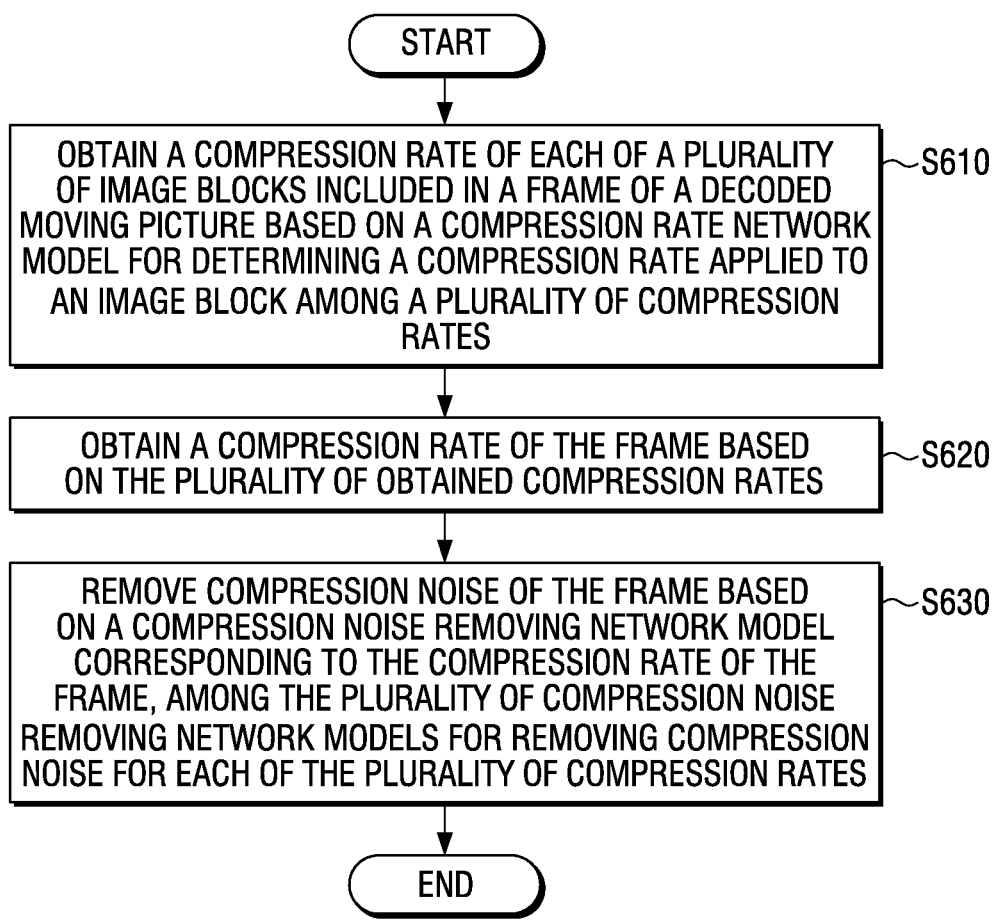

ELECTRONIC APPARATUS AND CONTROL METHOD THEREOF

CROSS-REFERENCE TO RELATED APPLICATION

This application is based on and claims priority under 35 U.S.C. § 119 to Korean patent application number 10-2018-0026209, filed on Mar. 6, 2018, in the Korean Intellectual Property Office, the disclosure of which is incorporated by reference herein in its entirety.

BACKGROUND

1. Field

The present disclosure relates to an electronic apparatus and a control method thereof, and, for example, to an electronic apparatus performing image processing and a control method thereof.

The disclosure also relates to an artificial intelligence (AI) system that simulates functions of a human brain such as cognition and determination using a machine learning algorithm, and application thereof.

2. Description of Related Art

Recently, artificial intelligence systems implementing intelligence of a human level are used in various fields. An artificial intelligence system refers to a system wherein a machine learns, determines, and becomes smarter by itself, unlike conventional rule-based smart systems. An artificial intelligence system shows a more improved recognition rate as it is used more, and becomes capable of understanding user preference more correctly. For this reason, conventional rule-based smart systems are gradually being replaced by deep learning-based artificial intelligence systems.

An artificial intelligence technology includes machine learning (for example, deep learning) and element technologies utilizing machine learning.

Machine learning refers to an algorithm technology of classifying/learning the characteristics of input data by itself, and an element technology refers to a technology of simulating functions of a human brain such as cognition and determination using a machine learning algorithm such as deep learning, and includes fields of technologies such as linguistic understanding, visual understanding, inference/prediction, knowledge representation, and operation control.

Examples of various fields to which artificial intelligence technologies are applied are as follows. Linguistic understanding refers to a technology of recognizing languages/characters of humans, and applying/processing them, and includes natural speech processing, machine translation, communication systems, queries and answers, voice recognition/synthesis, and the like. Visual understanding refers to a technology of recognizing an object in a similar manner to human vision, and processing the object, and includes recognition of an object, tracking of an object, search of an image, recognition of humans, understanding of a scene, understanding of a space, improvement of an image, and the like. Inference/prediction refers to a technology of determining information and then making logical inference and prediction, and includes knowledge/probability based inference, optimization prediction, preference based planning, recommendation, and the like. Knowledge representation refers to a technology of automatically processing information of human experiences into knowledge data, and includes knowledge construction (data generation/classification), knowledge management (data utilization), and the like. Operation control refers to a technology of controlling autonomous driving of vehicles and movements of robots, and includes movement control (navigation, collision, driving), operation control (behavior control), and the like.

Meanwhile, as there is an increasing demand for high quality moving pictures, compression of moving pictures has emerged as a very important technology. Since most methods of compressing moving pictures are based on lossy compression, restored images include various kinds of compression noise (a phenomenon of image quality degradation). Examples of representative compression noise include blocking, ringing, and flickering phenomena. A blocking or ringing phenomenon mostly occurs due to a quantization process during a compression process, and in the process, patterns that were not present in the original image appear. In the case of blocking, cross stripe patterns appear, and in the case of ringing, patterns in the form of haze appear.

In order to remove these patterns, first, a compression rate should be obtained as the first step, because the degree of generation of compression noise would vary depending on a compression rate. However, if there is only a moving picture without any additional information, a compression rate cannot be figured out, and in this case, prediction of a compression rate is needed.

Conventional technologies for predicting a compression rate of a moving picture mainly utilize a method of extracting feature points from an image compressed as a JPEG using human intuition, and classifying the feature points with a classifier such as a SVM (support vector machine). When such a method is used, prediction performance will be greatly dependent on design of feature points, but there is a problem that it is difficult to achieve optimal design.

In addition, most of conventional technologies of predicting a compression rate of a moving picture relate to images compressed as JPEGs and MPEG2s, of which image quality can be easily figured out by analyzing the degree of blocking. However, in the case of H.264 or HEVC which are standards that are mainly used at present for compression of moving pictures, deblocking filters are provided inside them. Due to this, characteristics of an image may vary greatly compared to a JPEG or an MPEG2, which makes it hard to use conventional technologies as they are.

Further, conventional technologies of removing compression noise adopted a process of receiving input of individual frames of a moving picture and outputting improved frames, and then gathering the output frames and making them into a moving picture. This process is effective in removing blocking and ringing phenomena that occur individually per frame, but has a problem that it is not very effective in removing a flickering phenomenon that occurs due to correlation among frames.

SUMMARY

The present disclosure addresses the aforementioned needs. Accordingly, the disclosure provides an electronic apparatus which removes compression noise based on a learning based compression noise removing network model corresponding to the predicted compression rate and a control method thereof.

According to an example embodiment of the present disclosure f, an electronic apparatus includes a storage configured to store a compression rate network model configured to identify a compression rate applied to an image block among a plurality of compression rates, and a plurality of compression noise removing network models for removing compression noise for each of the plurality of compression rates, and a processor configured to: obtain a compression rate of each of a plurality of image blocks included in a frame of a decoded moving picture based on the compression rate network model, obtain the compression rate of the frame based on the plurality of obtained compression rates, and remove compression noise of the frame based on a compression noise removing network model corresponding to the compression rate of the frame among the plurality of compression noise removing network models. The compression rate network model may be obtained by learning image characteristics of a plurality of restored image blocks corresponding to the plurality of compression rates respectively through a first artificial intelligence algorithm, and the plurality of restored image blocks can be generated by encoding a plurality of original image blocks, and decoding the encoded plurality of original image blocks, and the plurality of compression noise removing network models may be obtained by learning a relation between the plurality of original image blocks and the plurality of restored image blocks through a second artificial intelligence algorithm.

The processor may divide each of a plurality of frames in a preset number before and after the frame into a plurality of additional image blocks, obtain an additional compression rate of each of the plurality of additional image blocks based on the compression rate network model, and obtain a compression rate of the frame based on the plurality of compression rates and the plurality of additional compression rates.

The processor may calculate dispersion for a pixel value of each of the plurality of image blocks, obtain image blocks in a preset number among the plurality of image blocks based on the calculated dispersion, and obtain a compression rate of each of the obtained image blocks in the preset number based on the compression rate network model. The processor can obtain a compression rate of the frame based on the plurality of obtained compression rates.

The processor may divide the frame into the plurality of image blocks, remove compression noise of each of the plurality of image blocks based on the compression noise removing network model, and obtain a frame where compression noise has been removed by combining the plurality of image blocks where compression noise has been removed.

The processor may obtain a second image block and a third image block corresponding to a first image block which is one of the plurality of image blocks in frames before and after the frame, and remove compression noise of the first image block using the second image block and the third image block.

The processor may perform at least one convolution operation for each of the first image block, the second image block, and the third image block based on the compression noise removing network model, combine the first image block, the second image block, and the third image block for which the convolution operation has been performed, and remove compression noise of the first image block by performing at least one convolution operation for the combined image blocks.

The processor may calculate a first peak signal-to-noise ratio (PSNR) of the first image block and the second image block, and a second PSNR of the first image block and the third image block, and if at least one of the first PSNR and the second PSNR is smaller than a preset value, input the first image block in the compression noise removing network model in replacement of an image block corresponding to a PSNR smaller than the preset value, between the second image block and the third image block.

The processor may combine the plurality of image blocks where compression noise has been removed by making them overlap based on a weight based on a distance from a boundary.

The processor may divide the frame into a chrominance component and a luminance component, remove compression noise of the luminance component based on the compression noise removing network model, and remove compression noise of the frame by combining the chrominance component and the luminance component where compression noise has been removed. The plurality of compression noise removing network models may be obtained by learning a relation between a luminance component of the plurality of original image blocks and a luminance component of the plurality of restored image blocks through a second artificial intelligence algorithm.

The compression rate network model and the plurality of compression noise removing network models may have a deep learning network structure.

According to an example embodiment of the present disclosure, a control method of an electronic apparatus comprises obtaining a compression rate of each of a plurality of image blocks included in a frame of a decoded moving picture based on a compression rate network model configured to identify a compression rate applied to an image block among a plurality of compression rates, obtaining a compression rate of the frame based on the plurality of obtained compression rates, and removing compression noise of the frame based on a compression noise removing network model corresponding to the compression rate of the frame among the plurality of compression noise removing network models for removing compression noise for each of the plurality of compression rates. The compression rate network model may be obtained by learning image characteristics of a plurality of restored image blocks corresponding to the plurality of compression rates respectively through a first artificial intelligence algorithm, the plurality of restored image blocks may be generated by encoding a plurality of original image blocks, and decoding the encoded plurality of original image blocks, and the plurality of compression noise removing network models may be obtained by learning a relation between the plurality of original image blocks and the plurality of restored image blocks through a second artificial intelligence algorithm.

The step of obtaining a compression rate of the frame may further comprise the steps of dividing each of a plurality of frames in a preset number before and after the frame into a plurality of additional image blocks, obtaining an additional compression rate of each of the plurality of additional image blocks based on the compression rate network model, and obtaining a compression rate of the frame based on the plurality of compression rates and the plurality of additional compression rates.

The step of obtaining a compression rate of each of the plurality of image blocks may further comprise the steps of calculating dispersion for a pixel value of each of the plurality of image blocks, obtaining image blocks in a preset number among the plurality of image blocks based on the calculated dispersion, and obtaining a compression rate of each of the obtained image blocks in the preset number based on the compression rate network model. Also, the step of obtaining a compression rate of the frame may further comprise the step of obtaining a compression rate of the frame based on the compression rate of each of the obtained image blocks in a preset number.

The step of removing compression noise may comprise the steps of dividing the frame into the plurality of image blocks, removing compression noise of each of the plurality of image blocks based on the compression noise removing network model, and obtaining a frame where compression noise has been removed by combining the plurality of image blocks where compression noise has been removed.

The step of removing compression noise may further comprise the steps of obtaining a second image block and a third image block corresponding to a first image block which is one of the plurality of image blocks in frames before and after the frame, and removing compression noise of the first image block using the second image block and the third image block.

The step of removing compression noise of the first image block may comprise the steps of performing at least one convolution operation for each of the first image block, the second image block, and the third image block based on the compression noise removing network model, combining the first image block, the second image block, and the third image block for which the convolution operation has been performed, and removing compression noise of the first image block by performing at least one convolution operation for the combined image blocks.

The step of removing compression noise may further comprise the steps of calculating a first peak signal-to-noise ratio (PSNR) of the first image block and the second image block, and a second PSNR of the first image block and the third image block, and if at least one of the first PSNR and the second PSNR is smaller than a preset value, inputting the first image block in the compression noise removing network model in replacement of an image block corresponding to a PSNR smaller than the preset value, between the second image block and the third image block.

The control method of an electronic apparatus may further comprise the step of combining the plurality of image blocks where compression noise has been removed by making them overlap based on a weight based on a distance from a boundary.

The step of removing compression noise may comprise the steps of dividing the frame into a chrominance component and a luminance component, removing compression noise of the luminance component based on the compression noise removing network model, and removing compression noise of the frame by combining the chrominance component and the luminance component where compression noise has been removed. The plurality of compression noise removing network models may be obtained by learning a relation between a luminance component of the plurality of original image blocks and a luminance component of the plurality of restored image blocks through a second artificial intelligence algorithm.

The compression rate network model and the plurality of compression noise removing network models may have a deep learning network structure.

According to the aforementioned various example embodiments of the present disclosure, an electronic apparatus can improve compression noise removing performance by predicting a compression rate of a decoded moving picture, and removing compression noise based on a learning based compression noise removing network model corresponding to the predicted compression rate.

BRIEF DESCRIPTION OF THE DRAWINGS

The above and other aspects, features and advantages of various example embodiments of the present disclosure will be more readily appreciated from the following detailed description, taken in conjunction with the accompanying drawings, in which:

FIG. 6 is a flowchart illustrating an example control method of an electronic apparatus according to an embodiment of the present disclosure.

DETAILED DESCRIPTION

Figure 1A:
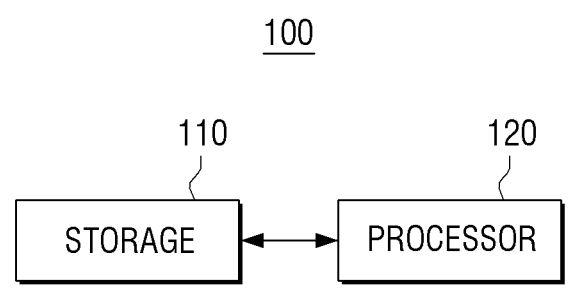
FIG. 1A is a block diagram illustrating an example configuration of an example electronic apparatus according to an embodiment of the present disclosure.

Various example embodiments of the present disclosure may be diversely modified. Specific example embodiments are illustrated in the drawings and are described in detail in the detailed description. However, it is to be understood that the present disclosure is not limited to any specific example embodiment, but includes all modifications, equivalents, and substitutions without departing from the scope and spirit of the present disclosure. Also, well-known functions or constructions may not be described in detail where they obscure the disclosure with unnecessary detail.

Hereinafter, various example embodiments of the present disclosure will be described in greater detail with reference to the accompanying drawings.

FIG. 1A is a block diagram illustrating an example configuration of an electronic apparatus (100) according to an embodiment of the present disclosure. As illustrated in FIG. 1A, the electronic apparatus (100) includes a storage (110) and a processor (e.g., including processing circuitry) (120).

The electronic apparatus (100) may be an apparatus performing image processing. For example, the electronic apparatus (100) may be an apparatus performing image processing based on data learned through an artificial intelligence algorithm. For example, the electronic apparatus (100) may, for example, and without limitation, be a desktop PC, a laptop computer, a smartphone, a tablet PC, a server, or the like. The electronic apparatus (100) may be a system itself wherein a clouding computer environment has been constructed. However, the present disclosure is not limited thereto, and the electronic apparatus (100) may be any apparatus that can perform image processing.

A storage (110) may store a compression rate network model for determining a compression rate applied to an image block, among a plurality of compression rates. For example, when an image block is input in a compression rate network model, the compression rate of the input image block may be output as a result.

An image block may refer, for example, to an image in a preset size, and for example, an image block may include a pixel in a 10×10 size. However, the present disclosure is not limited thereto, and an image block may be in various forms, without any restriction on its size or shape. An image block may be referred to as an image patch, but hereinafter, it will be described as an image block, for convenience of explanation.

A compression rate network model can be obtained by learning image characteristics of a plurality of restored image blocks corresponding to each of the plurality of compression rates through a first artificial intelligence algorithm, and the plurality of restored image blocks can be generated by encoding a plurality of original image blocks, and decoding the encoded plurality of original image blocks.

As losses occur in the processes of encoding and decoding, each of the plurality of restored image blocks may be different from their respective corresponding original image blocks. For example, the plurality of restored image blocks may contain compression noise such as blocking, ringing, and flickering.

The storage (110) may store a plurality of compression noise removing network models for removing compression noise for each of the plurality of compression rates. The plurality of compression noise removing network models may be obtained by learning a relation between the plurality of original image blocks and the plurality of restored image blocks through a second artificial intelligence algorithm.

The number of the plurality of compression noise removing network models may be the same as the number of the results that the compression rate network model can output. For example, the compression rate network model may be generated by learning a plurality of first restored image blocks encoded and decoded based on a quantization parameter (QP) 34, learning a plurality of second restored image blocks encoded and decoded according to a QP 37, learning a plurality of third restored image blocks encoded and decoded according to a QP 42, and learning a plurality of fourth restored image blocks encoded and decoded according to a QP 47.

Also, the plurality of compression noise removing network models may include a first compression noise removing network model generated by learning a plurality of first restored image blocks of a QP 34 and a plurality of first original image blocks corresponding thereto, a second compression noise removing network model generated by learning a plurality of second restored image blocks of a QP 37 and a plurality of second original image blocks corresponding thereto, a third compression noise removing network model generated by learning a plurality of third restored image blocks of a QP 42 and a plurality of third original image blocks corresponding thereto, and a fourth compression noise removing network model generated by learning a plurality of fourth restored image blocks of a QP 47 and a plurality of fourth original image blocks corresponding thereto.

The compression rate network model and the plurality of compression noise removing network models may be generated at an external server, and the electronic apparatus (100) may receive the compression rate network model and the plurality of compression noise removing network models from the external server, and store them in the storage (110). However, the present disclosure is not limited thereto, and the processor (120) may generate the compression rate network model and the plurality of compression noise removing network models, and store them in the storage (110).

The compression rate network model and the plurality of compression noise removing network models described so far may, for example, have a deep learning network structure. However, the present disclosure is not limited thereto, and the models may be any form if they are models that can learn image blocks. An example method for generating a compression rate network model and a plurality of compression noise removing network models will be described in greater detail below.

The storage (110) may store a decoded moving picture. For example, an external server may encode a moving picture and transmit it to a set top box, and the set top box may decode the encoded moving picture and transmit it to the electronic apparatus (100), and the electronic apparatus (100) may store the received decoded moving picture in the storage (110). Or, the electronic apparatus (100) may receive an encoded moving picture from an external server, and decode the encoded moving picture and store it in the storage (110).

Also, the storage (110) may store a plurality of original image blocks and a plurality of restored image blocks. However, the present disclosure is not limited thereto, and the storage (110) may store a plurality of moving pictures. The processor (120) may divide each frame of the plurality of moving pictures into a plurality of image blocks, and generate a plurality of original image blocks. In addition, the processor (120) may encode and decode each of the plurality of moving pictures, and divide each frame of the plurality of restored moving pictures into a plurality of image blocks to generate a plurality of restored image blocks.

The storage (110) may be implemented as a hard disc, non-volatile memory, volatile memory, and the like, and may have any kind of configuration if it is a configuration capable of storing data.

The processor (120) may include various processing circuitry and controls the overall operations of the electronic apparatus (100).

According to an embodiment of the present disclosure, the processor (120) may include various processing circuitry, such as, for example, and without limitation, a digital signal processor (DSP), a microprocessor, a time controller (TCON), and the like. However, the present disclosure is not limited thereto, and the forms of implementation may include processing circuitry including, for example, and without limitation, one or more of a central processing unit (CPU), a micro controller unit (MCU), a micro processing unit (MPU), a controller, an application processor (AP), a communication processor (CP), an ARM processor, or the like. The processor (120) may be implemented as a system on chip (SoC), or a large scale integration (LSI) having a processing algorithm embedded therein, or may be implemented in the form of a field programmable gate array (FPGA).

The processor (120) may obtain a compression rate of each of a plurality of image blocks included in a frame of a decoded moving picture based on the compression rate network model, obtain a compression rate of the frame based on the plurality of obtained compression rates, and remove compression noise of the frame based on a compression noise removing network model corresponding to the compression rate of the frame, among the plurality of compression noise removing network models.

The processor (120) may divide the frame into a plurality of image blocks, obtain a compression rate of each of the plurality of image blocks based on the compression rate network model, and obtain a compression rate of the frame based on the plurality of obtained compression rates.

For example, the processor (120) may divide the frame into a plurality of image blocks, each having a size of, for example, 37×37, and obtain a compression rate of each of the plurality of image blocks by inputting each of the plurality of image blocks in the compression rate network model. The processor (120) may determine the most frequent compression rate among a plurality of compression rates obtained from a frame as the compression rate of the frame.

The processor (120) may divide each of a plurality of frames in a preset number before and after the frame into a plurality of additional image blocks, obtain an additional compression rate of each of the plurality of additional image blocks based on the compression rate network model, and obtain a compression rate of the frame based on the plurality of compression rates and the plurality of additional compression rate.

For example, if the current frame is described as a $N^{th}$ frame, the processor (120) may divide total nine frames of from a $N-9^{th}$ frame to a $N-1^{st}$ frame into a plurality of additional image blocks, each of which having a size of 37×37, and input each of the plurality of additional image blocks in the compression rate network model, and thereby obtain an additional compression rate of each of the plurality of additional image blocks. Also, the processor (120) may determine the most frequent compression rate among the plurality of compression rates obtained from the $N^{th}$ frame, and the plurality of additional compression rates obtained from the $N-9^{th}$ frame to the $N-1^{st}$ frame as the compression rate of the $N^{th}$ frame.

The processor (120) may determine the compression rate of the current frame by further reflecting a compression rate of at least one of frames before and after the frame.

The processor (120) may calculate dispersion for a pixel value of each of the plurality of image blocks, obtain image blocks in a preset number among the plurality of image blocks based on the calculated dispersion, obtain a compression rate of each of the obtained image blocks in a preset number based on the compression rate network model, and obtain a compression rate of the frame based on the plurality of obtained compression rates.

For example, the processor (120) may obtain, for example, 96 image blocks having high dispersion for a pixel value of each of the plurality of image blocks, and obtain a compression rate of the frame based on the compression rates of the 96 image blocks. A texture region in a frame mostly has high dispersion, and the processor (120) may determine a compression rate of the frame mainly based on a texture region.

The processor (120) may divide the frame into a plurality of image blocks, remove compression noise of each of the plurality of image blocks based on the compression noise removing network model, and obtain a frame where compression noise has been removed by combining the plurality of image blocks where compression noise has been removed.

For example, if the compression rate of the current frame is determined as 34 among QPs 34, 37, 42, and 47, the processor (120) may remove compression noise by sequentially inputting a plurality of image blocks included in the compression noise removing network model corresponding to a QP 34.

The processor (120) may obtain a second image block and a third image block corresponding to a first image block which is one of the plurality of image blocks in frames before and after the frame, and remove compression noise of the first image block using the second image block and the third image block.

The processor (120) may perform at least one convolution operation for each of the first image block, the second image block, and the third image block based on the compression noise removing network model, and combine the first image block, the second image block, and the third image block for which the convolution operation has been performed, and remove compression noise of the first image block by performing at least one convolution operation for the combined image blocks. Here, the compression noise removing network model may store a filter, etc. used for a convolution operation.

However, the present disclosure is not limited thereto, and the order of a convolution operation may vary in diverse forms. For example, the processor (120) may incorporate the first image block, the second image block, and the third image block, and may perform at least one convolution operation for the image blocks incorporated based on the compression noise removing network model. That is, an artificial intelligence model may be implemented in various forms, and is not limited to a specific form.

The processor (120) may obtain from an adjacent frame belonging to the same scene an image block including an image similar to the image block of the current frame, and remove compression noise from the image block of the current frame using the obtained image block.

The processor (120) may calculate a first peak signal-to-noise ratio (PSNR) of the first image block and the second image block, and a second PSNR of the first image block and the third image block. If at least one of the first PSNR and the second PSNR is smaller than a preset value, the processor (120) may input the first image block in the compression noise removing network model in replacement of an image block corresponding to a PSNR smaller than the preset value, between the second image block and the third image block.

A PSNR may indicate, for example, a difference between two image blocks with a numerical value, and also indicates that, the smaller a PSNR is, the bigger a difference between two image blocks becomes. If the second image block and the third image block have a big difference from the first image block, the processor (120) removes compression noise of the first image block, without using the second image block and the third image block. If the compression noise removing network model has been trained to receive input of three image blocks, the processor (120) may input the first image block one more time in replacement of an image block of which PSNR with the first image block is smaller than a preset value, between the second image block and the third image block.

For example, if a PSNR of the first image block and the second image block is smaller than a preset value, the processor (120) may remove compression noise of the first image block by inputting the first image block, and the first image block and the third image block.

The processor (120) may combine the plurality of image blocks where compression noise has been removed by making them overlap based on a weight according to a distance from a boundary. For example, the processor may combine the plurality of image blocks where compression noise has been removed by making them overlap based on a Gaussian weight according to a distance from a boundary. However, the present disclosure is not limited thereto, and the processor (120) may combine the plurality of image blocks where compression noise has been removed by making them overlap using various methods.

The processor (120) may divide the frame into a chrominance component and a luminance component, remove compression noise of the luminance component based on the compression noise removing network model, and remove compression noise of the frame by combining the chrominance component and the luminance component where compression noise has been removed.

For example, the processor (120) may divide the frame into a first frame including only a chrominance component, and a second frame including only a luminance component, and remove compression noise of the second frame. The method for removing compression noise may be the same as described above. The processor (120) may obtain a frame where compression noise has been removed by combining the first frame and the second frame where compression noise has been removed.

The plurality of compression noise removing network models can be obtained by learning a relation between a luminance component of the plurality of original image blocks and a luminance component of the plurality of restored image blocks through a second artificial intelligence algorithm.

Figure 1B:
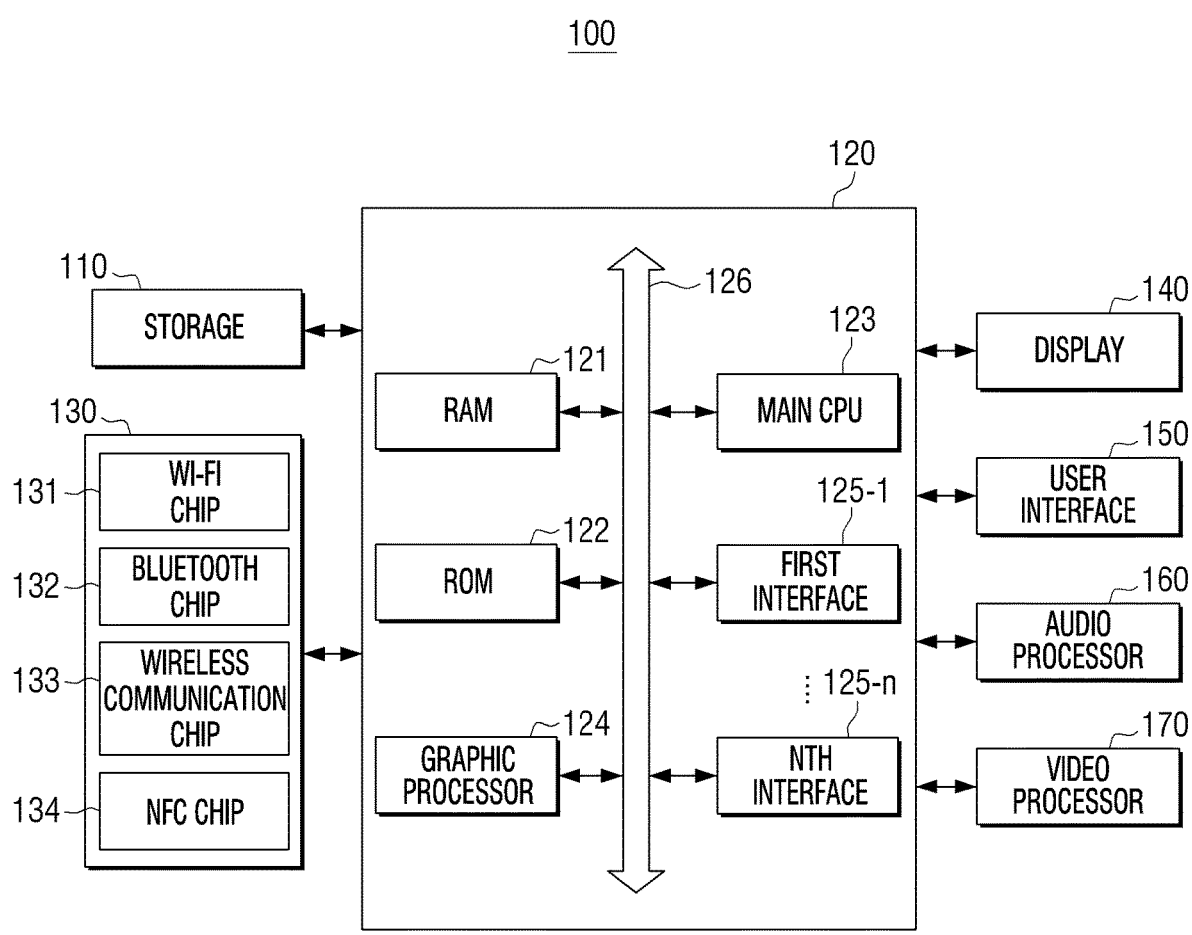
FIG. 1B is a block diagram illustrates an example configuration of an example electronic apparatus according to an embodiment of the present disclosure.

FIG. 1B is a block diagram illustrating an example configuration of the electronic apparatus (100) according to an embodiment of the present disclosure. Referring to FIG. 1B, the electronic apparatus (100) includes a storage (110), a processor (e.g., including processing circuitry) (120), a communicator (e.g., including communication circuitry) (130), a display (140), a user interface (150), an audio processor (e.g., including audio processing circuitry) (160), and a video processor (e.g., including video processing circuitry) (170). Descriptions of the components illustrated in FIG. 1B that overlap with the components illustrated in FIG. 1A, may not be repeated here.

The processor (120) may include various processing circuitry and controls the overall operations of the electronic apparatus (100) using various programs stored in the storage (110).

The processor (120) may include a RAM (121), a ROM (122), a main CPU (123), a graphic processor (124), $1^{st}$ to $n^{th}$ interfaces (125-1~125-n), and a bus (126).

The RAM (121), the ROM (122), the main CPU (123), the graphic processor (124), the $1^{st}$ to $n^{th}$ interfaces (125-1~125-n), etc. may be connected to one another through the bus (126).

The $1^{st}$ to $n^{th}$ interfaces (125-1~125-n) are connected with the aforementioned various components. One of the interfaces may be a network interface that is connected to an external server through a network.

The main CPU (123) accesses the storage (110), and performs booting using an O/S stored in the storage (110). Also, the main CPU (123) performs various operations using various programs, etc. stored in the storage (110).

In the ROM (122), an instruction set for system booting, and the like are stored. When a turn-on instruction is input and power is supplied, the main CPU (123) copies the O/S stored in the storage (110) in the RAM (121) according to the instruction stored in the ROM (122), and boots the system by executing the O/S. When booting is completed, the main CPU (123) copies various application programs stored in the storage (110) in the RAM (121), and performs various operations by executing the application programs copied in the RAM (121).

The graphic processor (124) generates a screen including various objects such as icons, images, and texts using an operation unit (not shown) and a renderer (not shown). The operation unit (not shown) operates attribute values such as coordinate values, shapes, sizes, and colors by which each object will be displayed according to the layout of the screen, based on the received control instruction. The renderer (not shown) generates screens in various layouts including objects, based on the attribute values operated at the operation unit (not shown). The screens generated at the renderer (not shown) are displayed in the display region of the display (140).

The aforementioned operations of the processor (120) may be carried out by a program stored in the storage (110).

The storage (110) stores various types of data, such as an operating system (O/S) software module for driving the electronic apparatus (100), a compression rate network model module, and a compression noise removing network model module.

The communicator (130) may include various communication circuitry and performs communication with various types of external servers according to various types of communication methods. The communicator (130) may include various chips including various communication circuitry, such as, for example, and without limitation, a Wi-Fi chip (131), a Bluetooth chip (132), a wireless communication chip (133), an NFC chip (134), and the like. The processor (120) may perform communication with various types of external servers using the communicator (130).

The Wi-Fi chip (131) and the Bluetooth chip (132) may perform communication using a Wi-Fi method and a Bluetooth method, respectively. In the case of using the Wi-Fi chip (131) or the Bluetooth chip (132), various types of connection information such as an SSID or a session key is transmitted and received first, and connection of communication is performed using the information, and various types of information can be transmitted and received thereafter. The wireless communication chip (133) may refer, for example, to a chip performing communication according to various communication standards such as IEEE, Zigbee, $3^{rd}$ generation (3G), $3^{rd}$ generation partnership project (3GPP), and long term evolution (LTE). The NFC chip (134) may refer, for example, to a chip that operates in a near field communication (NFC) method using a 13.56 MHz band among various RF-ID frequency bands such as 135 kHz, 13.56 MHz, 433 MHz, 860~960 MHz, and 2.45 GHz.

The processor (120) may receive a compression rate network model and a plurality of compression noise removing network models through the communicator (130). The processor (120) may receive in real time a moving picture decoded from a set top box through the communicator (130).

The display (140) may be implemented in various forms of displays such as, for example, and without limitation, a liquid crystal display (LCD), an organic light emitting diodes (OLED) display, a plasma display panel (PDP) display, etc. In the display (140), a driving circuit that may be implemented in forms such as, for example, and without limitation, an a-si TFT, a low temperature poly silicon (LTPS) TFT, an organic TFT (OTFT), etc., a backlight unit, and the like may also be included. Meanwhile, the display (140) may also be combined with a touch detector and implemented as a touch screen.

The processor (120) may control the display (140) such that the display displays a moving picture where compression noise has been removed.

The user interface (150) receives various user interactions. The user interface (150) may be implemented in various forms according to implementation examples of the electronic apparatus (100). For example, and without limitation, the user interface (150) may be a button provided on the electronic apparatus (100), a microphone receiving user voice, a camera detecting user motions, and the like. In case the electronic apparatus (100) is implemented as an electronic apparatus based on touches, the user interface (150) may be implemented in the form of a touch screen that forms an inter-layered structure with a touch pad. In this case, the user interface (150) can be used as the aforementioned display (140).

The audio processor (160) may include various audio processing circuitry and/or executable program elements and performs processing of audio data. In the audio processor (160), various types of processing such as, for example, and without limitation, decoding, amplification, noise filtering, and the like of audio data may be performed.

The video processor (170) may include various video processing circuitry and/or executable program elements and performs processing of video data. In the video processor (170), various types of image processing such as, for example, and without limitation, decoding, scaling, noise filtering, frame rate conversion, resolution conversion, and the like of video data may be performed.

The above-described compression rate network model and the plurality of compression noise removing network models provided by an external server may, for example, be determination models that have been trained based on an artificial intelligence algorithm, and for example, they may be models based on a neural network. Trained determination models may be designed to simulate the brain structure of humans on a computer, and they may include a plurality of network nodes having a weight, which simulate neurons of a human neural network. The plurality of network nodes may respectively form a relation of connection, to simulate synaptic activities of neurons wherein neurons give and take signals through synapses. Trained determination models may include, for example, neural network models, and/or deep learning models that have been developed from neural network models. In deep learning models, a plurality of network nodes may be located in different depths (or, layers) from one another, and may give and take data according to a relation of convolution connection. As non-limiting examples of trained determination models, there may be a deep neural network (DNN), a recurrent neural network (RNN), a bidirectional recurrent deep neural network (BRDNN), etc., but are not limited thereto.

The electronic apparatus (100) may use a personal assistant program which is a program dedicated to artificial intelligence (or an artificial intelligence agent), for removing compression noise of a moving picture decoded as described above. The personal assistant program may be a dedicated program for providing artificial intelligence (AI)-based services, and it may be executed by conventional universal processors (e.g. a CPU) or by specific AI dedicated processors (e.g. a GPU and the like).

For example, in case a preset user input (e.g. photographing of an image according to operation of a photographing button), or a moving picture decoded from an external apparatus is input, the artificial intelligence agent may be operated (or executed).

As another embodiment of the present disclosure, the electronic apparatus (100) may receive input of a decoded moving picture, and transmit the moving picture to an external server. The external server may remove compression noise of the decoded moving picture by itself, and transmit the moving picture where compression noise has been removed to the electronic apparatus (100).

Through the method as described above, the processor (120) may predict a compression rate of a decoded moving picture, and remove compression noise based on a learning based compression noise removing network model corresponding to the predicted compression rate.

Hereinafter, operations of the processor (120) will be described in greater detail with reference to the accompanying drawings.

Figure 2:
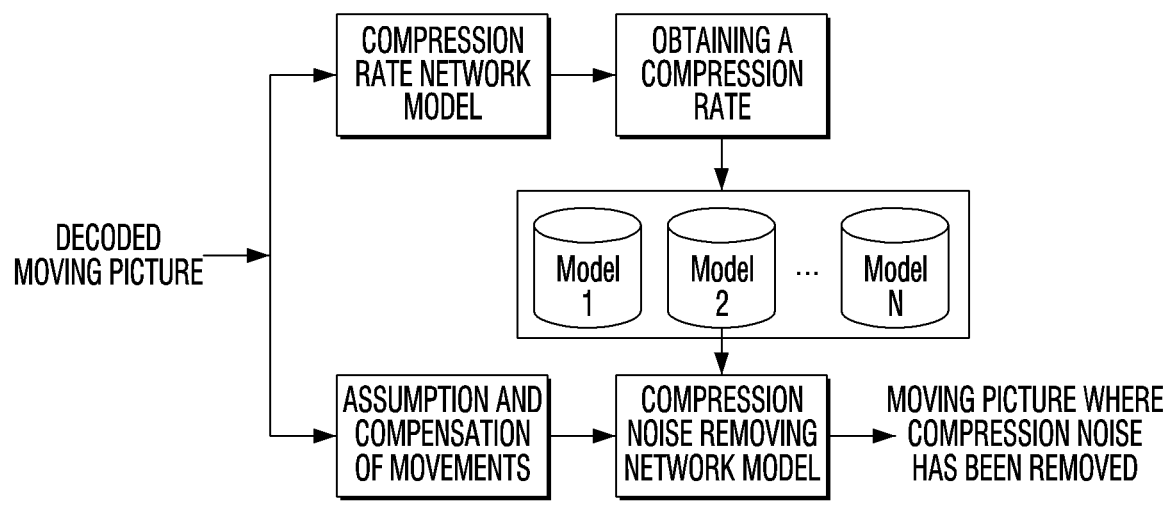
FIG. 2 is a diagram illustrating an example operation of a processor according to an embodiment of the present disclosure.

FIG. 2 is a diagram illustrating an example operation of the processor (120) according to an embodiment of the present disclosure. In FIG. 2, the upper part illustrates an operation for obtaining a compression rate, and the lower part illustrates an operation of removing compression noise using a compression noise removing network model corresponding to the obtained compression rate.

As illustrated in FIG. 2, the processor (120) may receive an input of a decoded moving picture. Here, the decoded moving picture may be a moving picture including compression noise that occurred due to encoding and decoding of the original moving picture. The compression noise may include blocking, ringing, flickering, and the like.

The processor (120) may divide each of a plurality of frames included in the decoded moving picture into a plurality of image blocks.

Also, the processor (120) may obtain a compression rate of each of the plurality of image blocks using a compression rate network model. For example, an image block compressed as a QP 47 may show a greater degree of blocking, ringing, flickering, etc. than an image block compressed as a QP 34, and the processor (120) may obtain a compression rate based on the compression noise of each image block.

Further, the processor (120) may obtain a compression rate of a frame based on a plurality of compression rates corresponding to each of a plurality of image blocks included in a frame. A frame is output simultaneously from the display (140), and in case the compression noise of a plurality of image blocks included in a frame is removed based on different compression noise removing network models, the user may feel a sense of difference.

For example, in case the compression noise of the first image block is removed using a first compression noise removing network model corresponding to a QP 34, and the compression noise of the second image block included in the same frame as the first image block is removed using a second compression noise removing network model corresponding to a QP 47, the compression rate of the second image block may be higher than that of the first image block. Accordingly, the second compression noise removing network model may remove compression noise a little bit more strongly that the first compression noise removing network model. In this case, the degree of removing compression noise may be different between the first image block and the second image block, and the user may feel a sense of difference regarding this phenomenon.

The method as above has been described based on one frame, but the present disclosure is not limited thereto. For example, the processor (120) may obtain compression rates for a plurality of frames, and remove compression noise using a compression noise removing network model corresponding to the compression rates obtained for the plurality of frames.

Based on the obtained compression rates, the processor (120) may determine a compression noise removing network model that will be used for removing compression noise of a corresponding frame.

The processor (120) may obtain a similar additional image block from a frame adjacent to a frame including an image block through assumption and compensation of movements with respect to each of a plurality of image blocks. For example, the processor (120) may obtain a first additional image block which is similar to the current image block from a frame right before the current frame including the current image block, and obtain a second additional image block which is similar to the current image block from a frame right after the current frame.

In addition, the processor (120) may remove the compression noise of the current image block by inputting the current image block, the first additional image block, and the second additional image block in the compression noise removing network model determined as above.

Further, the processor (120) may remove the compression noise of all image blocks included in a decoded moving picture, and reconstruct all image blocks where compression noise has been removed, and thereby obtain a moving picture where compression noise has been removed.

Figure 3:
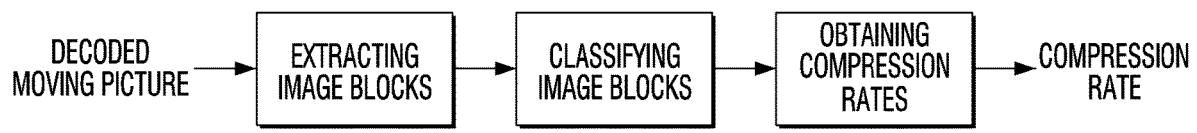
FIG. 3 is a diagram illustrating an example method for obtaining a compression rate according to an embodiment of the present disclosure.

FIG. 3 is a diagram illustrating an example method for obtaining a compression rate according to an embodiment of the present disclosure.

As illustrated in FIG. 3, the processor (120) may divide each of the frames of a decoded moving picture into a plurality of image blocks, and obtain a plurality of image blocks that will be used for obtaining a compression rate, among the plurality of image blocks.

For example, the processor (120) may divide one frame having an FHD resolution into 400 image blocks. The processor (120) may make the size of each image block different from one another, and any method may be used if the method for dividing image blocks is the same both in the step for obtaining a compression rate and the step for removing compression noise. The processor (120) may obtain 96 image blocks in a higher rank of which dispersion size for a pixel value is big, among 400 image blocks. In general, many changes occur in a texture region according to the compression rate, and the region has high dispersion. The processor (120) obtains 96 image blocks which are assumed to be a texture region, and here, the 96 image blocks may be an appropriate sample for determining a compression rate, since they show great changes according to the compression rate.

The processor (120) may divide a plurality of image blocks based on the compression rate of each of the image blocks. For example, the processor (120) may obtain the compression rate of each of the 96 image blocks using a compression rate network model. Also, the processor (120) may classify the plurality of image blocks, by classifying 48 image blocks among 96 image blocks as a QP 34, 24 image blocks as a QP 37, 12 image blocks as a QP 42, and 12 image blocks as a QP 47.

Further, the processor (120) may obtain a compression rate of the frame. For example, since the classification of 48 image blocks, which takes the greatest portion of the 96 image blocks is a QP 34, the processor (120) may determine the compression rate of the frame as 34. Hereinafter, for the convenience of explanation, the QP value having the highest number of image blocks will be described as "a first prediction result," and the QP value having the second highest number of image blocks as "a second prediction result."

The processor (120) may determine the compression rate of the current frame by reflecting the compression rates of a plurality of image blocks included in the frames before the current frame. For example, the processor (120) may obtain compression rates of total 960 image blocks from the previous frames of from a N-9$^{th}$ frame to a N-1$^{st}$ frame, and the current frame, and determine the compression rate of the current frame based on the 960 compression rates. The processor (120) may obtain the compression rate of the current frame based on 10 frames including the current frame.

The processor (120) may also determine the compression rate of the current frame by reflecting compression rates of a plurality of image blocks included in a frame right before the current frame, the current frame, and a frame right after the current frame. For example, the processor (120) may obtain compression rates of total 288 image blocks from a frame right before the current frame, the current frame, and a frame right after the current frame, and determine the compression rate of the current frame based on the 288 compression rates. That is, the processor (120) may also determine the compression rate of the current frame based on three frames including the current frame.

The processor (120) may obtain the compression rate of the current frame by comprehensively using the methods described so far. For example, when the second prediction result based on 10 frames includes the first prediction result by the current frame, the processor (120) may determine the compression rate of the current frame as the first prediction result based on 10 frames, and if the second prediction result based on 10 frames does not include the first prediction result by the current frame, the processor (120) may determine the compression rate of the current frame as the first prediction result based on 3 frames. In this case, the processor (120) can perform stronger prediction when the characteristics of the frame change in a moving picture, and may determine that the received channel has been changed when the compression rate becomes different.

Figure 4A:
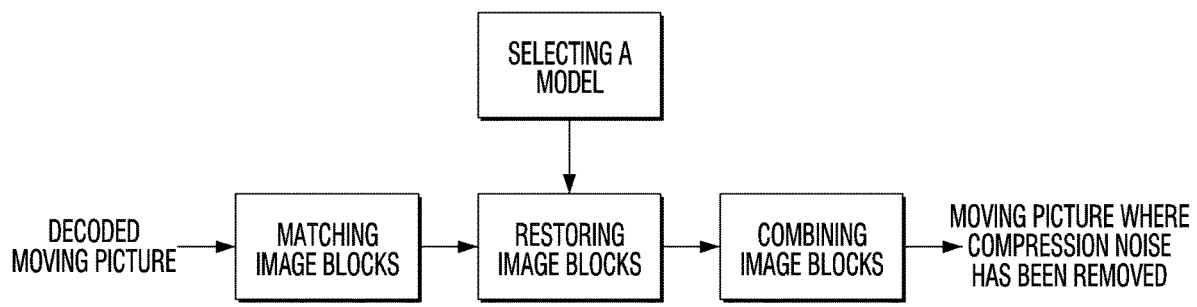
FIGS. 4A and 4B are diagrams illustrating an example method for removing compression noise according to various embodiments of the present disclosure.
Figure 4B:
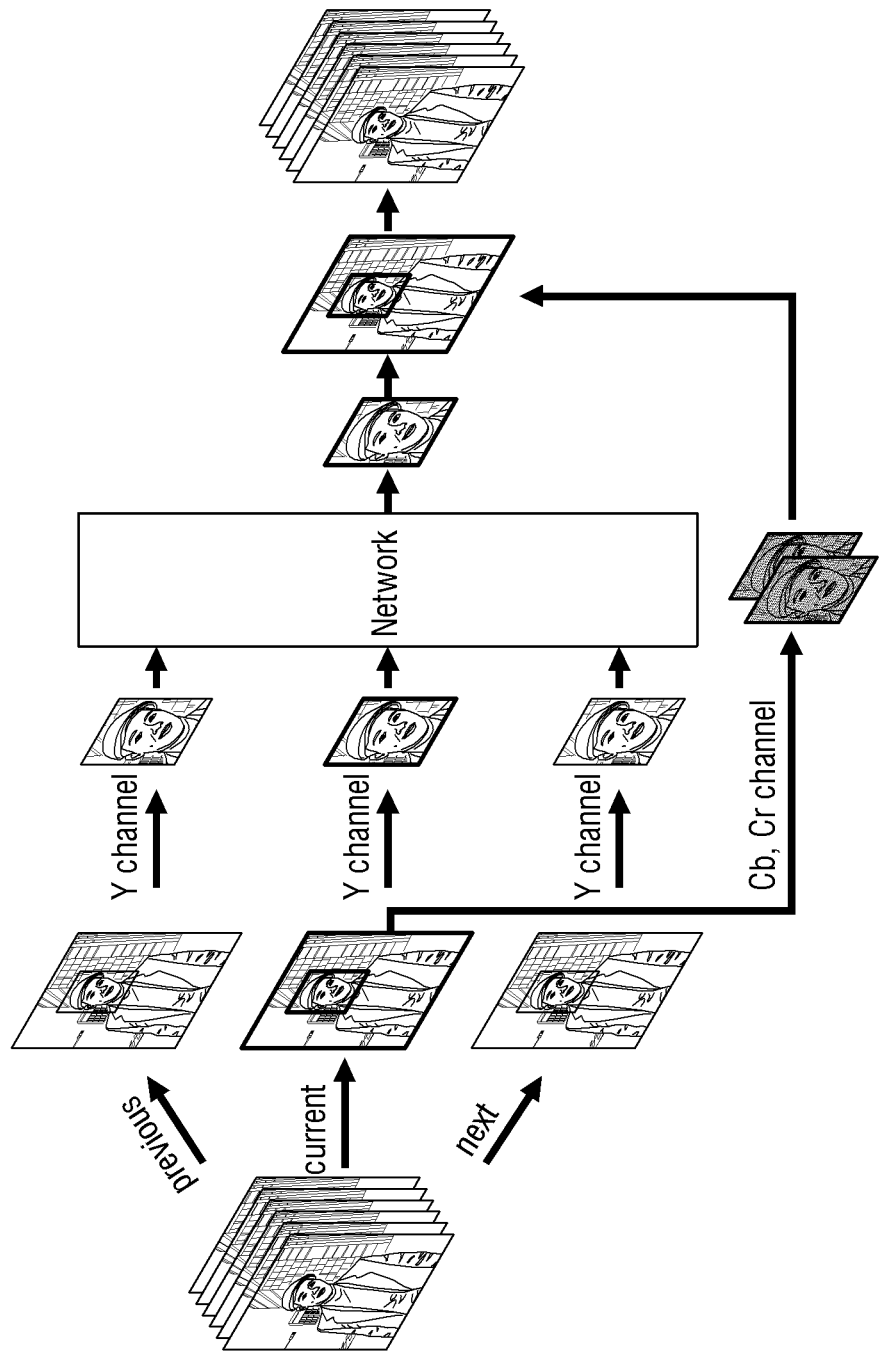

FIGS. 4A and 4B are diagrams illustrating an example method for removing compression noise according to various embodiments of the present disclosure.

The processor (120) may obtain a compression noise removing network model corresponding to the compression rate of the frame obtained in FIG. 3, among a plurality of compression noise removing network models. For example, the plurality of compression noise removing network models may be models that were trained to remove the compression noise of image blocks compressed as QPs 34, 37, 42, and 47. In case the compression rate of the frame obtained in FIG. 3 is a QP 34, the processor (120) may obtain a compression noise removing network model corresponding to the QP 34.

The processor (120) may divide each of the frames of a decoded moving picture into a plurality of image blocks. The method of dividing the frames may be the same as the method in the step of determining a compression rate.

In addition, the processor (120) may sequentially remove compression noise from each of a plurality of image blocks. Hereinafter, an operation of the processor (120) for an image block will be described.

The processor (120) may obtain a first additional image block and a second additional image block which are similar to the current image block from frames right before and right after the current frame, and match the first additional image block and the second additional image block to the current image block. The matched three image blocks may be used as an input to a compression noise removing network model.

Between the first additional image block and the second additional image block, the image block of which peak signal-to-noise ratio with the current image block is equal to or smaller than a preset value may be replaced with the current image block. For example, between the first additional image block and the second additional image block, the image block of which peak signal-to-noise ratio with the current image block is equal to or smaller than 30 dB may be replaced with the current image block.

The method for obtaining a similar frame from frames right before and after the current frame may be the same as the method for obtaining a similar frame in the process of generating a plurality of compression noise removing network models.

The processor (120) may remove the compression noise of the current block by inputting the matched three image blocks in the compression noise removing network model obtained based on the compression rate of the frame.

If the above-described process is repeated for all image blocks, the processor (120) may obtain a plurality of image blocks where compression noise has been removed. The processor (120) may generate a plurality of frames by combining a plurality of image blocks where compression noise has been removed, and may restore a moving picture by combining the plurality of frames. Here, the restored moving picture may be a moving picture that has been obtained by removing compression noise from a decoded moving picture.

The processor (120) may overlap a specific region of an adjacent image block, in the process of combining the adjacent image block. The processor (120) may overlap a specific region of an adjacent image block by applying a Gaussian weight. Accordingly, a phenomenon that a boundary between image blocks appears clearly can be prevented.

Referring to FIG. 4A, it has been described that compression noise is removed while a chrominance component and a luminance component of an image block are not divided from each other, for the convenience of explanation.

As illustrated in FIG. 4B, the processor (120) may divide a chrominance component (Cb, Cr) and a luminance component (Y) of an image block, and remove compression noise only for the luminance component. For example, the processor (120) may divide the current image block into a chrominance component block and a luminance component block, and obtain a first additional luminance component block and a second additional luminance component block which are similar to the current luminance component block, from frames right before and right after the current frame. Here, the processor (120) may divide the frames right before and right after the current frame into a chrominance component block and a luminance component block, respectively, and obtain a first additional luminance component block and a second additional luminance component block which are similar to the current luminance component block, from the luminance component block of the frame right before the current frame and the luminance component block of the frame right after the current frame, respectively. Further, the processor (120) may remove the compression noise of the current luminance component block by inputting the current luminance component block, the first additional luminance component block, and the second additional luminance component block in a compression noise removing network model. Then, the processor (120) may restore an image block where compression noise has been removed by combining the current luminance component block where compression noise has been removed with a chrominance component block, and by repeating this process, the processor (120) may restore a moving picture where compression noise has been removed.

Figure 5A:
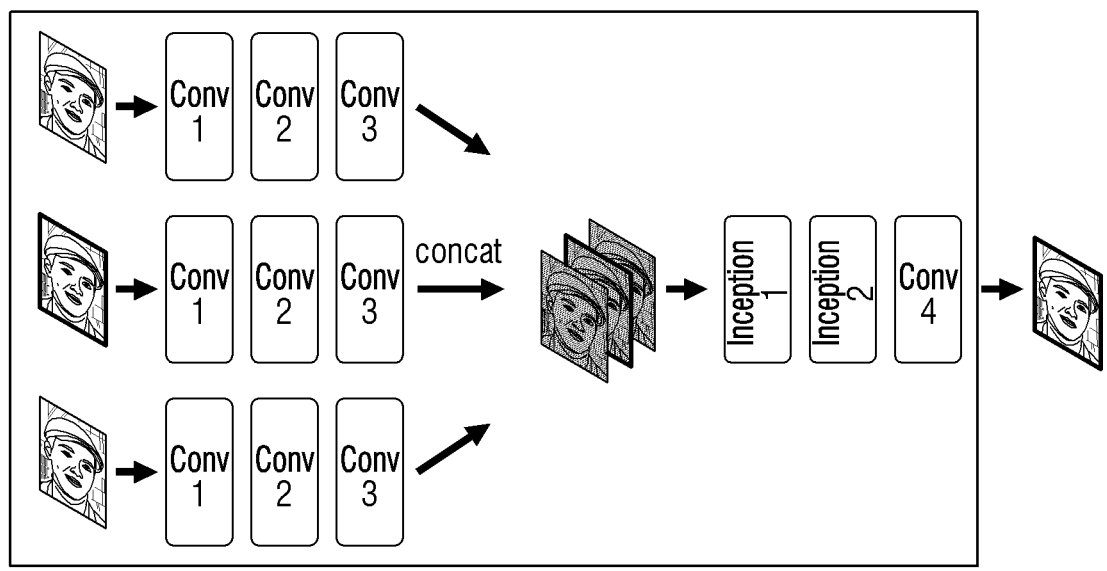
FIGS. 5A and 5B are diagrams illustrating an example compression noise removing network model according to an embodiment of the present disclosure.
Figure 5B:
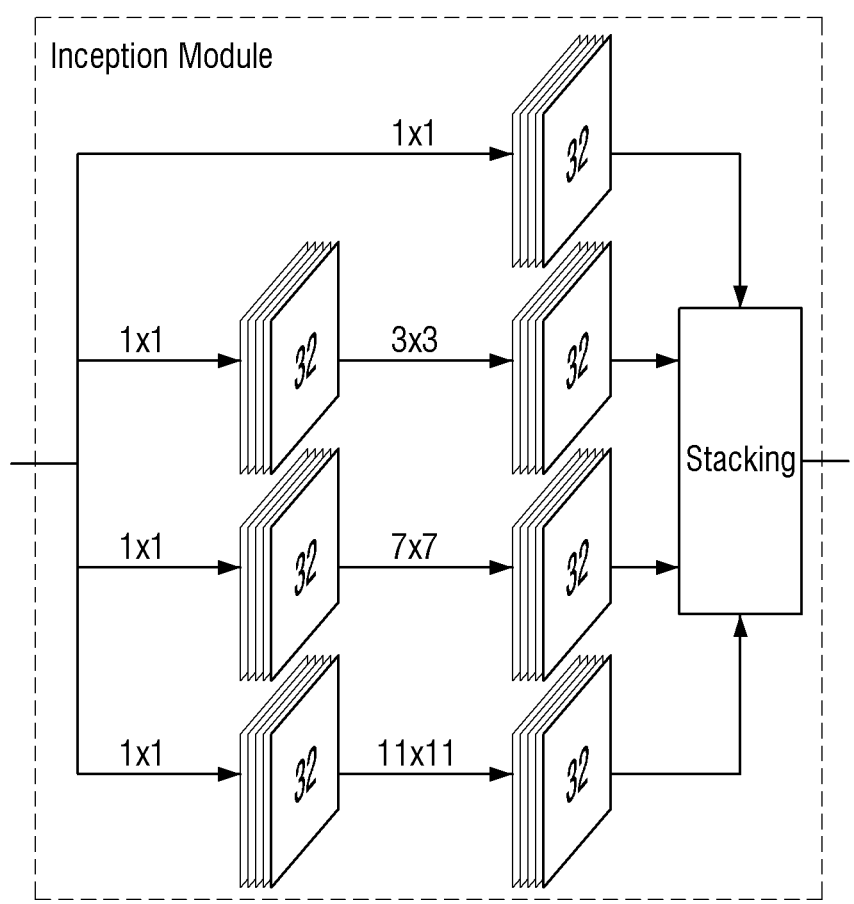

FIGS. 5A and 5B are diagrams illustrating an example compression noise removing network model according to an embodiment of the present disclosure.

A plurality of compression noise removing network models may have already been trained by a method using deep learning. For example, each of a plurality of compression noise removing network models may be trained according to QPs 34, 37, 42, and 47, and may be trained such that selective removal of compression noise with respect to the four types of compression rates can be performed effectively. Training of each of a plurality of compression noise removing network models may proceed based on learning data that has been prepared by extracting image blocks from a moving picture of which group of picture (GOP) is set to 30, with respect to QPs 34, 37, 42, and 47. For example, considering the fact that a human visual recognition system is more sensitive to a luminance component than to a chrominance component, only a luminance component may be used for training.

Each of the compression noise removing network models may consist of total 16 convolution layers in a 3×3 size, and three fully connected layers. Here, the number of neurons of the fully connected layers may be 512. A nonlinear function is arranged behind each convolution layer, and the number of parameters of a network to be learned may be approximately 4.5 M.

As illustrated in FIG. 5A, each of the compression noise removing network models may use a convolution network consisting of eight layers. Among the layers, two layers may adopt an inception structure wherein diversity of feature points can be secured with 1×1, 3×3, 7×7 and 11×11 filters, and at the same time, the number of parameters can be reduced.

In the three convolution layers around the left side in FIG. 5A, the image block right before the current image block, the current image block, and the image block right after the current image block are processed in parallel. Since the current image block contains the most important information for extracting feature points, the features points of 32 channels are extracted from the current image block, and the feature points of 16 channels are extracted from the image blocks right before and right after the current image block. In this way, information of the current frame can be reflected in a more substantial way.

As illustrated in FIG. 5B, the feature points extracted from 64 channels are combined through an inception structure, and the information of the image blocks right before and right after the current image block can thereby be used. Ultimately, an image block where compression noise has been removed as it passed through a network consisting of eight layers can be output. For example an objective function, a mean squared error may be used, and for a method of optimization, an ADAM may be used, and for a learning rate, 0.001 may be used.

The processor (120) may obtain a plurality of compression noise removing network models by itself through learning. For example, the processor (120) may divide each of the frames of 20 moving pictures wherein original moving pictures and restored moving pictures obtained by encoding and decoding the original moving pictures exist in pairs into a plurality of image blocks having a size of 37×37. The processor (120) may learn a compression noise removing network model using only a plurality of image blocks of which dispersion for a pixel value is equal to or greater than 0.002, among a plurality of image blocks. In addition, the processor (120) may amplify the pairs of image blocks through right and left reversal, rotation by 90 degrees, extraction of augmentation, etc. for each of a plurality of image blocks.

The processor (120) may obtain image blocks which are similar to the current image block from frames right before and right after the current frame through a 3-step search, and match the obtained image blocks with the current image block. In order to prevent and/or reduce a phenomenon where there are no similar image blocks as there is a big change of scenes, and that it is disadvantageous to reflect the information of the image blocks right before and right after the current image block, the processor (120) may use the obtained image blocks right before and right after the current image block only when the PSNR of the image blocks with the current image block is equal to or greater than 30 dB, and use the current image block repetitively in replacement of the obtained image blocks when the PSNR of the image blocks with the current image block is less than 30 dB.

The processor (120) may generate a compression noise removing network model for a QP, using pairs of image blocks prepared through the above-described method. Then, the processor (120) may generate a compression noise removing network model corresponding to a new QP value, using an original moving picture and a restored moving picture corresponding to the new QP value.

FIG. 6 is a flowchart illustrating an example control method of an electronic apparatus according to an embodiment of the present disclosure.

Based on a compression rate network model for determining a compression rate applied to an image block among a plurality of compression rates, a compression rate of each of a plurality of image blocks included in the frame of a decoded moving picture is obtained (S610). A compression rate of the frame is obtained based on the plurality of obtained compression rates (S620). Compression noise of the frame is removed based on a compression noise removing network model corresponding to the compression rate of the frame, among a plurality of compression noise removing network models for removing compression noise for each of a plurality of compression rates (S630). The compression noise removing network model can be obtained by learning image characteristics of a plurality of restored image blocks corresponding to each of the plurality of compression rates through a first artificial intelligence algorithm, and the plurality of restored image blocks can be generated by encoding a plurality of original image blocks, and decoding the encoded plurality of original image blocks. Also, the plurality of compression noise removing network models can be obtained by learning a relation between the plurality of original image blocks and the plurality of restored image blocks through a second artificial intelligence algorithm.

The step of obtaining a compression rate of the frame (S620) may further comprise the steps of dividing each of a plurality of frames in a preset number before and after the frame into a plurality of additional image blocks, obtaining an additional compression rate of each of the plurality of additional image blocks based on the compression rate network model, and obtaining a compression rate of the frame based on the plurality of compression rates and the plurality of additional compression rates.

The step of obtaining a compression rate of each of the plurality of image blocks (S610) may further comprise the steps of calculating dispersion for a pixel value of each of the plurality of image blocks, obtaining image blocks in a preset number among the plurality of image blocks based on the calculated dispersion, and obtaining a compression rate of each of the obtained image blocks in a preset number based on the compression rate network model. The step of obtaining a compression rate of the frame (S620) may further comprise the step of obtaining a compression rate of the frame based on the compression rate of each of the obtained image blocks in a preset number.

The step of removing compression noise (S620) may comprise the steps of dividing the frame into a plurality of image blocks, removing compression noise of each of the plurality of image blocks based on the compression noise removing network model, and obtaining a frame where compression noise has been removed by combining the plurality of image blocks where compression noise has been removed.

The step of removing compression noise (S620) may further comprise the steps of obtaining a second image block and a third image block corresponding to a first image block which is one of the plurality of image blocks in frames before and after the frame, and removing compression noise of the first image block using the second image block and the third image block.

The step of removing compression noise of the first image block may comprise the steps of performing at least one convolution operation for each of the first image block, the second image block, and the third image block based on the compression noise removing network model, combining the first image block, the second image block, and the third image block for which the convolution operation has been performed, and removing compression noise of the first image block by performing at least one convolution operation for the combined image blocks.

The step of removing compression noise (S620) may further comprise the steps of calculating a first peak signal-to-noise ratio (PSNR) of the first image block and the second image block, and a second PSNR of the first image block and the third image block, and if at least one of the first PSNR and the second PSNR is smaller than a preset value, inputting the first image block in the compression noise removing network model in replacement of an image block corresponding to a PSNR smaller than the preset value, between the second image block and the third image block.

The control method of an electronic apparatus may further comprise the step of combining the plurality of image blocks where compression noise has been removed by making them overlap based on a weight according to a distance from a boundary.

The step of removing compression noise (S620) may comprise the steps of dividing the frame into a chrominance component and a luminance component, removing compression noise of the luminance component based on the compression noise removing network model, and removing compression noise of the frame by combining the chrominance component and the luminance component where compression noise has been removed. The plurality of compression noise removing network models can be obtained by learning a relation between a luminance component of the plurality of original image blocks and a luminance component of the plurality of restored image blocks through a second artificial intelligence algorithm.

The compression rate network model and the plurality of compression noise removing network models may have a deep learning network structure.

According to the aforementioned various example embodiments of the present disclosure, an electronic apparatus can predict a compression rate of a decoded moving picture, even if there is no additional information. An electronic apparatus can improve compression noise removing performance by removing compression noise based on a learning based compression noise removing network model corresponding to the predicted compression rate. For example, an electronic apparatus can greatly reduce a flickering phenomenon at the same time as removing blocking and ringing phenomena, by combining temporal information through continuous frames.

According to an embodiment of the present disclosure, the various embodiments described above may be implemented as software including instructions stored in machine-readable storage media, which can be read by machines (e.g.: computers). The machines may refer, for example, to apparatuses that call instructions stored in a storage medium, and can operate according to the called instructions, and the apparatuses may include an electronic apparatus according to the aforementioned embodiments (e.g. an electronic apparatus (A)). In case an instruction is executed by a processor, the processor may perform a function corresponding to the instruction by itself, or using other components under its control. An instruction may include a code that is generated by a compiler or executed an interpreter. A storage medium that is readable by machines may be provided in the form of a non-transitory storage medium. The term 'non-transitory' may refer, for example, to a storage medium that is tangible, but does not indicate whether data is stored in the storage medium semi-permanently or temporarily.

According to an embodiment of the present disclosure, the method according to the various embodiments described above may be provided while being included in a computer program product. A computer program product may refer, for example, to a product, and it can be traded between a seller and a buyer. A computer program product can be distributed on-line in the form of a storage medium that is readable by machines (e.g. compact disc read only memory (CD-ROM)), or through an application store (e.g. play store TM). In the case of on-line distribution, at least a portion of a computer program product may be stored in a storage medium such as the server of the manufacturer, the server of the application store, and the memory of the relay server at least temporarily, or may be generated temporarily.

Further, according to an embodiment of the present disclosure, the various embodiments described above may be implemented in a recording medium that can be read by a computer or an apparatus similar to a computer, using software, hardware, or any combination thereof. In some cases, the embodiments described in the present specification may be implemented by a processor itself. According to implementation by software, the embodiments such as processes and functions described in the present specification may be implemented by separate software modules. Each of the software modules can perform one or more functions and operations described in the present specification.

Meanwhile, computer instructions for performing processing operations of machines according to the aforementioned various embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine. A non-transitory computer-readable medium refers to a medium that stores data semi-permanently, and is readable by machines. Examples of a non-transitory computer-readable medium, may include a CD, a DVD, a hard disc, a blue-ray disc, a USB, a memory card, a ROM, and the like.

Each of the components according to the aforementioned various embodiments (e.g. a module or a program) may include a singular object or a plurality of objects. Among the aforementioned corresponding sub components, some sub components may be omitted, or other sub components may be further included in the various embodiments. Some components (e.g. a module or a program) may be integrated as an object, and perform the functions that were performed by each of the components before integration identically or in a similar manner. A module, a program, or operations performed by other components according to the various embodiments may be executed sequentially, in parallel, repetitively, or heuristically. Or, at least some of the operations may be executed or omitted in a different order, or other operations may be added.

While the present disclosure has been illustrated and described with reference to various example embodiments thereof, the present disclosure is not limited to the aforementioned embodiments, and it will be apparent that various modifications can be made by those having ordinary skill in the technical field to which the present disclosure belongs, without departing from the spirit and scope of the present disclosure, for example, as claimed by the appended claims. It is intended that such modifications are not to be interpreted independently from the technical idea or prospect of the present disclosure.

What is claimed is:

1. An electronic apparatus comprising:
   a storage configured to store a compression rate network model configured to identify a compression rate applied to an image block from among a plurality of compression rates, and a plurality of compression noise removing network models configured to remove compression noise for each of the plurality of compression rates; and
   a processor configured to:
   receive a decoded moving picture including a sequence of a plurality of decoded frames,
   divide a frame of the plurality of decoded frames into a plurality of image blocks,
   obtain a predicted compression rate of each of the plurality of image blocks included in the frame of the decoded moving picture based on the compression rate network model,
   determine most frequent compression rate among the plurality of obtained predicted compression rates for the plurality of image blocks of the frame as a predicted compression rate of the frame, and
   remove compression noise of the frame based on a compression noise removing network model corresponding to the compression rate of the frame from among the plurality of compression noise removing network models,
   wherein the compression rate network model is obtained by learning image characteristics of a plurality of restored image blocks corresponding to the plurality of compression rates through a first artificial intelligence algorithm,
   wherein the plurality of restored image blocks are generated by encoding a plurality of original image blocks, and decoding the encoded plurality of original image blocks, and
   wherein the plurality of compression noise removing network models are obtained by learning a relation between the plurality of original image blocks and the plurality of restored image blocks through a second artificial intelligence algorithm.

2. The electronic apparatus of claim 1, wherein the processor is configured to divide each of the plurality of frames in a preset number of frames before and after the frame into a plurality of additional image blocks, to obtain an additional predicted compression rate of each of the plurality of additional image blocks based on the compression rate network model, and to obtain a compression rate of the frame based on the plurality of compression rates and the plurality of additional compression rates.

3. The electronic apparatus of claim 1, wherein the processor is configured to calculate dispersion for a pixel value of each of the plurality of image blocks in the frame, to obtain image blocks in a preset number among the plurality of image blocks based on the calculated dispersion, to obtain a compression rate of each of the obtained image blocks in the preset number based on the compression network model, and to obtain a compression rate of the frame based on the plurality of obtained compression rates.

4. The electronic apparatus of claim 1, wherein the processor is configured to remove compression noise of each of the plurality of image blocks based on the compression noise removing network model, and to obtain a frame in which compression noise has been removed by combining the plurality of image blocks in which compression noise has been removed.

5. The electronic apparatus of claim 4, wherein the processor is configured to obtain a second image block and a third image block corresponding to a first image block, the first image block being one of the plurality of image blocks in frames before and after the frame, and to remove compression noise of the first image block using the second image block and the third image block.

6. The electronic apparatus of claim 5, wherein the processor is configured to perform at least one convolution operation for each of the first image block, the second image block, and the third image block based on the compression noise removing network model, and to combine the first image block, the second image block, and the third image block for which the convolution operation has been performed, and to remove compression noise of the first image block by performing at least one convolution operation for the combined image blocks.

7. The electronic apparatus of claim 5, wherein the processor is configured to calculate a first peak signal-to-noise ratio (PSNR) of the first image block and the second image block, and a second PSNR of the first image block and the third image block, and based on at least one of the first PSNR and the second PSNR being smaller than a preset value, input the first image block in the compression noise removing network model in place of an image block corresponding to a PSNR smaller than the preset value between the second image block and the third image block.

8. The electronic apparatus of claim 4, wherein the processor is configured to combine the plurality of image blocks in which compression noise has been removed by overlapping the blocks based on a weight based on a distance from a boundary.

9. The electronic apparatus of claim 1, wherein the processor is configured to divide the frame into a chrominance component and a luminance component, to remove compression noise of the luminance component based on the compression noise removing network model, and to remove compression noise of the frame by combining the chrominance component and the luminance component in which compression noise has been removed, and
wherein the plurality of compression noise removing network models are obtained by learning a relation between a luminance component of the plurality of original image blocks and a luminance component of the plurality of restored image blocks through a second artificial intelligence algorithm.

10. The electronic apparatus of claim 1, wherein the compression network model and the plurality of compression noise removing network models have a deep learning network structure.

11. A method controlling of an electronic apparatus, comprising:
receiving a decoded moving picture including a sequence of a plurality of decoded frames;
dividing a frame of the plurality of decoded frames into a plurality of image blocks;
obtaining a predicted compression rate of each of the plurality of image blocks included in the frame of the decoded moving picture based on a compression rate network model configured to identify a compression rate applied to an image block from among a plurality of compression rates;
determining most frequent compression rate among the plurality of obtained predicted compression rates for the plurality of image blocks of the frame as a predicted compression rate of the frame, and
removing compression noise of the frame based on a compression noise removing network model corresponding to the compression rate of the frame from among a plurality of compression noise removing network models configured to remove compression noise for each of the plurality of compression rates,
wherein the compression rate network model is obtained by learning image characteristics of a plurality of restored image blocks corresponding to the plurality of compression rates through a first artificial intelligence algorithm,
wherein the plurality of restored image blocks are generated by encoding a plurality of original image blocks, and decoding the encoded plurality of original image blocks, and
wherein the plurality of compression noise removing network models are obtained by learning a relation between the plurality of original image blocks and the plurality of restored image blocks through a second artificial intelligence algorithm.

12. The method of controlling an electronic apparatus of claim 11,
wherein determining comprises:
dividing each of the plurality of frames in a preset number of frames before and after the frame into a plurality of additional image blocks;
obtaining an additional predicted compression rate of each of the plurality of additional image blocks based on the compression rate network model; and
obtaining a compression rate of the frame based on the plurality of compression rates and the plurality of additional compression rates.

13. The method of controlling an electronic apparatus of claim 11,
wherein obtaining a compression rate of each of the plurality of image blocks comprises:
calculating dispersion for a pixel value of each of the plurality of image blocks in the frame;
obtaining image blocks in a preset number among the plurality of image blocks based on the calculated dispersion; and
obtaining a compression rate of each of the obtained image blocks in the preset number based on the compression network model, and
wherein determining comprises:
obtaining a compression rate of the frame based on the compression rate of each of the obtained image blocks in a preset number.

14. The method of controlling an electronic apparatus of claim 11,
wherein removing compression noise comprises:
removing compression noise of each of the plurality of image blocks based on the compression noise removing network model; and obtaining a frame where compression noise has been removed by combining the plurality of image blocks where compression noise has been removed.

15. The method of controlling an electronic apparatus of claim 14,
wherein removing compression noise further comprises:
obtaining a second image block and a third image block corresponding to a first image block, the first image block being one of the plurality of image blocks in frames before and after the frame; and
removing compression noise of the first image block using the second image block and the third image block.

16. The method of controlling an electronic apparatus of claim 15,
wherein removing compression noise of the first image block comprises:
performing at least one convolution operation for each of the first image block, the second image block, and the third image block based on the compression noise removing network model;
combining the first image block, the second image block, and the third image block for which the convolution operation has been performed; and
removing compression noise of the first image block by performing at least one convolution operation for the combined image blocks.

17. The method of controlling an electronic apparatus of claim 15,
wherein removing compression noise further comprises:
calculating a first peak signal-to-noise ratio (PSNR) of the first image block and the second image block, and a second PSNR of the first image block and the third image block; and
based on at least one of the first PSNR and the second PSNR being smaller than a preset value, inputting the first image block in the compression noise removing network model in place of an image block corresponding to a PSNR smaller than the preset value between the second image block and the third image block.

18. The method controlling of an electronic apparatus of claim 14, further comprising: combining the plurality of image blocks in which compression noise has been removed by overlapping the image blocks based on a weight based on a distance from a boundary.

19. The method of controlling an electronic apparatus of claim 11,
wherein removing compression noise comprises:
dividing the frame into a chrominance component and a luminance component;
removing compression noise of the luminance component based on the compression noise removing network model; and
removing compression noise of the frame by combining the chrominance component and the luminance component in which compression noise has been removed, and
wherein the plurality of compression noise removing network models are obtained by learning a relation between a luminance component of the plurality of original image blocks and a luminance component of the plurality of restored image blocks through a second artificial intelligence algorithm.

20. The method of controlling an electronic apparatus of claim 11, wherein the compression network model and the plurality of compression noise removing network models have a deep learning network structure.

* * * * *